(12) United States Patent
Miyauchi et al.

(10) Patent No.: US 7,611,167 B2
(45) Date of Patent: Nov. 3, 2009

(54) VEHICLE FUEL TANK

(75) Inventors: Kunio Miyauchi, Saitama (JP); Atsushi Ohba, Saitama (JP); Hironao Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 177 days.

(21) Appl. No.: 11/243,646

(22) Filed: Oct. 5, 2005

(65) Prior Publication Data

US 2006/0071467 A1 Apr. 6, 2006

(30) Foreign Application Priority Data

Oct. 6, 2004 (JP) .............................. P2004-293970

(51) Int. Cl.
*B60P 3/22* (2006.01)
*B65D 88/22* (2006.01)
(52) U.S. Cl. ...................................... 280/834; 220/563
(58) Field of Classification Search ................. 280/109, 280/124, 781, 784, 785, 834, 830; 206/524.4, 206/535, 534.2, 593, 0.6; 105/358, 360; 296/15; D12/95; 114/75; 220/581, 582, 220/584, 563; 200/734
See application file for complete search history.

(56) References Cited

U.S. PATENT DOCUMENTS

| | | | | | |
|---|---|---|---|---|---|
| 1,562,074 | A | * | 11/1925 | Baum | 220/563 |
| 2,119,949 | A | * | 6/1938 | Blau et al. | 65/135.2 |
| 2,758,845 | A | * | 8/1956 | Doyle et. al. | 280/834 |
| 4,081,050 | A | * | 3/1978 | Hennessey et al. | 180/233 |
| 4,480,845 | A | * | 11/1984 | Hansen | 280/834 |
| 4,764,408 | A | * | 8/1988 | Stedman et al. | 428/71 |
| 4,844,278 | A | * | 7/1989 | Freiwald et al. | 220/563 |
| 4,974,743 | A | * | 12/1990 | Sasaki et al. | 220/694 |
| 5,004,269 | A | * | 4/1991 | Pelt | 280/837 |
| 5,044,397 | A | * | 9/1991 | Szlaga et al. | 137/587 |
| 5,147,077 | A | * | 9/1992 | Nakajima et al. | 224/413 |
| 5,596,971 | A | * | 1/1997 | Kidokoro | 123/516 |
| 6,109,310 | A | * | 8/2000 | Peotter | 141/7 |
| 6,138,857 | A | * | 10/2000 | Keller | 220/495.01 |
| 6,550,811 | B1 | * | 4/2003 | Bennett et al. | 280/833 |
| 6,712,234 | B2 | * | 3/2004 | Boecker | 220/563 |
| 6,875,258 | B2 | * | 4/2005 | Kuperus | 96/147 |
| 7,198,111 | B2 | * | 4/2007 | Dierker et al. | 169/62 |
| 2002/0125254 | A1 | * | 9/2002 | Hagano et al. | 220/562 |
| 2003/0213527 | A1 | * | 11/2003 | Yanase et al. | 141/59 |

(Continued)

FOREIGN PATENT DOCUMENTS

JP 57-32909 7/1982

(Continued)

*Primary Examiner*—Lesley D Morris
*Assistant Examiner*—Daniel Yeagley
(74) *Attorney, Agent, or Firm*—Carrier, Blackman & Associates, P.C.; Joseph P. Carrier; William D. Blackman

(57) ABSTRACT

A fuel tank is provided which suppresses wave motion on the liquid surface of fuel which occurs when a vehicle accelerates or decelerates. A front wall and/or a rear wall of the fuel tank includes a plurality of steps formed integrally therewith. The liquid surface of the fuel striking the steps is dispersed, and wave motion on the liquid surface is thereby suppressed. Since the steps are formed in the front wall and/or the rear wall of the fuel tank, the volume of the tank is not reduced.

23 Claims, 11 Drawing Sheets

U.S. PATENT DOCUMENTS

2006/0273572 A1 * 12/2006 Yamamura .................. 280/834

FOREIGN PATENT DOCUMENTS

| JP | 61226335 A | * | 10/1986 |
| JP | 2-34443 | | 3/1990 |
| JP | 08011557 A | * | 1/1996 |
| JP | 10238346 A | * | 9/1998 |
| JP | 2004068738 A | * | 3/2004 |
| JP | 2005263043 A | * | 9/2005 |

* cited by examiner (COMP. EX.)

(EX.)

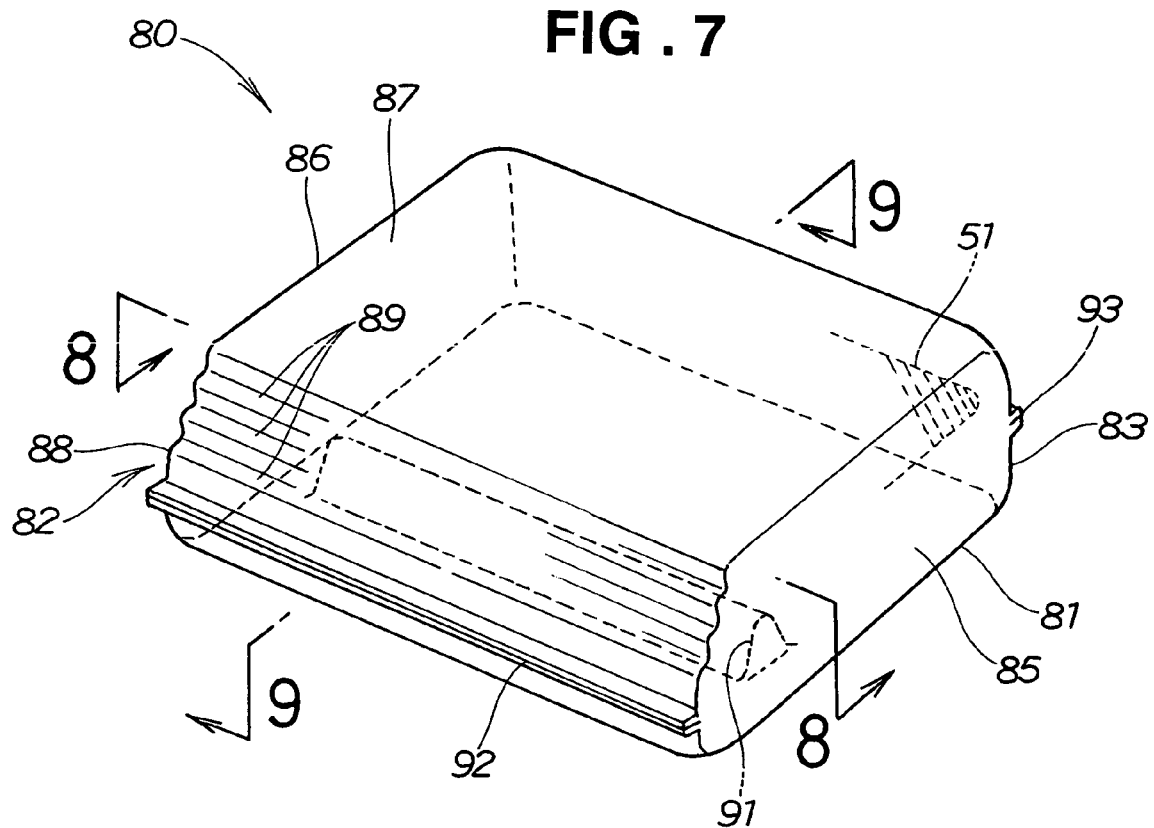
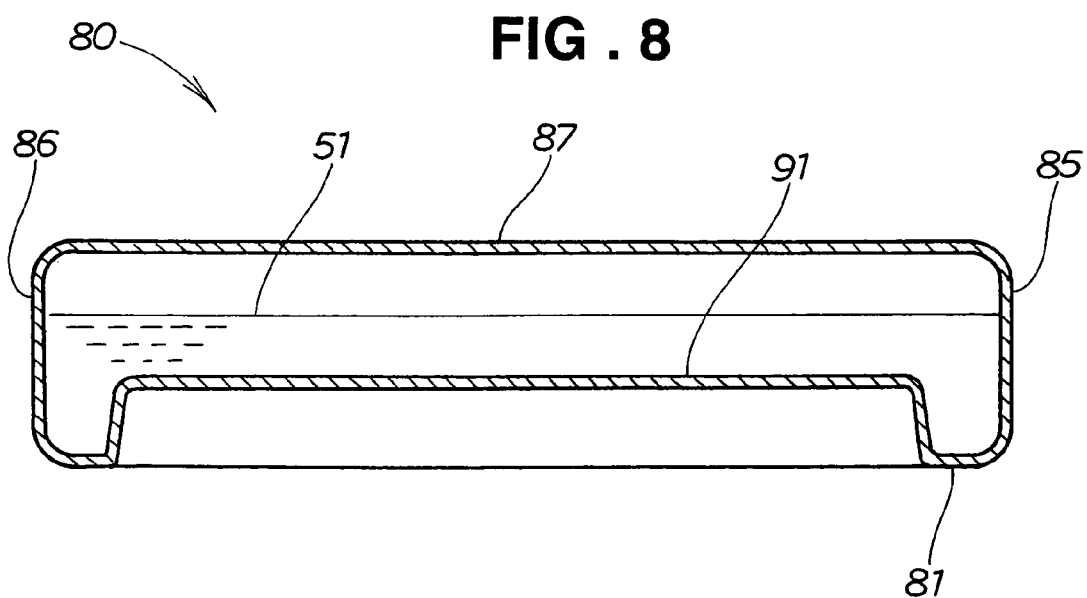

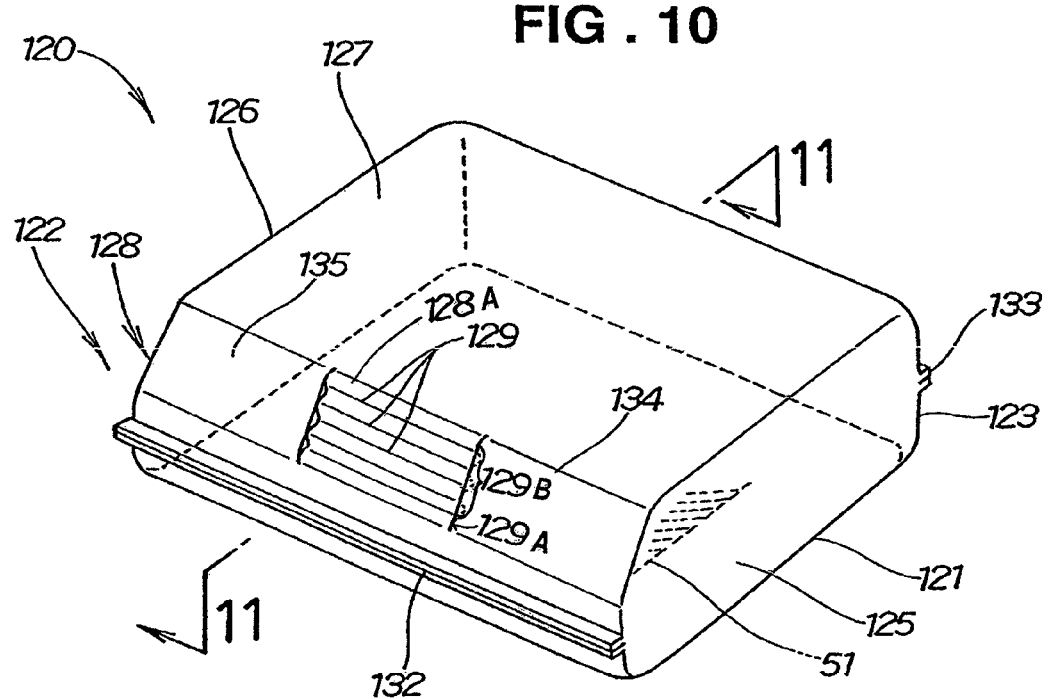
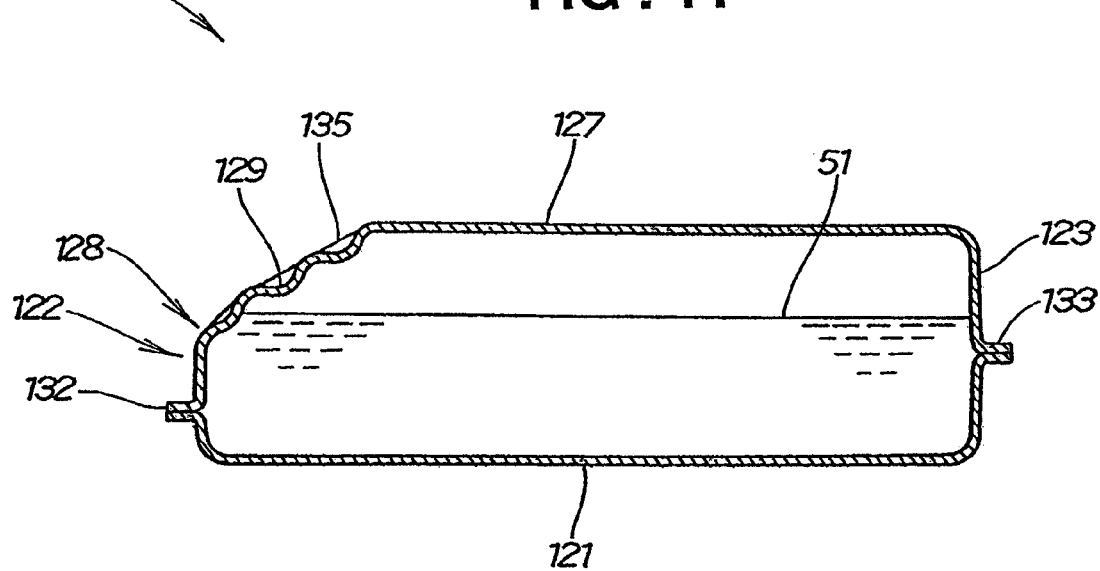

VEHICLE FUEL TANK

CROSS-REFERENCE TO RELATED APPLICATIONS

The present invention claims priority under 35 USC 119 based on Japanese patent application No. 2004-293970 filed on Oct. 6, 2004. The subject matter of this priority document is incorporated by reference herein.

BACKGROUND OF THE INVENTION

1. Field of the Invention

The present invention relates to fuel tanks configured to suppress a liquid noise caused by a rapid movement of fuel when a vehicle accelerates or decelerates.

2. Description of the Background Art

In the field of vehicle fuel tanks, plastic fuel tanks formed by employing blow molding are known. Such plastic fuel tanks include features which are intended to suppress a liquid noise caused by a rapid movement of fuel when a vehicle accelerates or decelerates. Japanese Utility Model Laid-Open Publication Nos. HEI-2-34443 and SHO-57-32909, for example, propose fuel tanks provided with a barrier wall(s) (absorber) for checking movement of fuel in a tank during vehicle acceleration or deceleration.

First, a fuel tank disclosed in HEI-2-34443 will be described with reference to FIG. 14.

Referring to FIG. 14, a fuel tank 300 includes a tank body 301 for storing fuel, and a suppression wall 303 provided within the tank body 301 for suppressing a surge of fuel 302 when a vehicle accelerates or decelerates. The suppression wall 303 is formed with a plurality of through holes 304 to permit passage of the fuel 302. The suppression wall 303 is formed separately from the tank body 301, and is inserted when the tank body 301 is blow molded, and after the blow molding, is welded to the tank body 301.

The fuel tank 300, however, has the disadvantage that the suppression wall 303 formed separately from the tank body 301 results in an increased number of components and an increased number of manufacturing steps.

Next, a fuel tank disclosed in SHO-57-32909 will be described with reference to FIG. 15.

Referring to FIG. 15, a fuel tank 310 includes a tank body 311 for storing fuel, and a pair of hollow wave cancellation boards 313, 313 provided integrally within the tank 311 and spaced longitudinally for suppressing movement of fuel 312. The wave cancellation boards 313 each have wave cancellation pieces 314, 315 integrally formed within the tank body 311 from above and below when the tank body 311 is blow molded. They are configured to prevent surging of the fuel 312 when a vehicle accelerates or decelerates (hereinafter, referred to as a "liquid movement suppression effect").

However, the fuel tank 310 has the problem that use of the wave cancellation boards 313, 313, having a given volume and provided in two places within the tank body 311, leads to a reduced volume of the tank body 311 and a reduced capacity of storing the fuel 312.

Therefore, there is demand for fuel tanks having a liquid movement suppression effect, without increasing the number of components, and which minimizes both the number of manufacturing steps and a reduction in the fuel storage capacity.

SUMMARY OF THE INVENTION

The present invention provides a vehicle plastic fuel tank for storing fuel which comprises: a bottom; front and rear walls rising from the bottom; left and right side walls rising from the bottom; and a top wall continuous with upper edges of the front and rear walls and upper edges of the left and right side walls. In the fuel tank, the front wall and/or the rear wall includes a plurality of steps formed integrally therewith. The steps suppress wave motion on a liquid surface of the fuel which occurs when a vehicle accelerates or decelerates.

The steps, integrally formed in the front wall and/or the rear wall, suppress wave motion on the liquid surface of the fuel which occurs during vehicle acceleration or deceleration. Consequently, for manufacturing the fuel tank having a liquid movement suppression effect, the number of components is reduced and the number of manufacturing steps is reduced. Also, the integral formation of the steps in the front wall and/or the rear wall minimizes a reduction in the volume of the tank to ensure the fuel storing capacity.

In an alternative embodiment, the bottom or the top wall preferably includes a suppression wall for suppressing a longitudinal movement of the fuel. Consequently, wave motion on the liquid surface of the fuel which occurs when the vehicle accelerates or decelerates can be further suppressed, and an abnormal noise generated by wave motion on the liquid surface of the fuel can be further reduced.

In another alternative embodiment, the front wall and/or the rear wall preferably comprises a plurality of wall portions, the wall portions including a combination of portions formed with steps and flat portions without steps. A wave on the liquid surface of the fuel, which occurs when the vehicle accelerates or decelerates, strikes the stepped portions and the flat portions. The striking energy of the liquid surface striking the steps is dispersed while the striking energy of the liquid surface striking the flat portions is not dispersed. Therefore, the liquid surface striking the flat portions heads toward the liquid surface striking the steps, and the liquid surfaces interfere with each other, thereby reducing the liquid surface energy as a whole. Consequently, an abnormal noise generated by the fuel striking the front wall and/or the rear wall is suppressed.

In another alternative embodiment, the front wall and/or the rear wall preferably comprises a plurality of wall portions, the wall portions formed with steps, wherein adjacent wall portions have steps formed out of phase with each other. For example, a central portion of the wall is formed with steps, and second steps, out of phase with the central steps, are formed on each side of the central steps. This arrangement can stagger the timing of striking of a wave caused by sloshing or flowing of the fuel against the central steps and the second steps. Consequently, wave energy can be dispersed, and an abnormal noise (sloshing or liquid moving noise) is suppressed.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

Preferred embodiments of the present invention will be described in detail below, by way of example only, with reference to the accompanying drawings, in which:

FIG. 7 is a perspective view of a fuel tank according to a second embodiment of the present invention showing a suppression wall extending upward from a bottom of the fuel tank;

FIG. 8 is a cross-sectional view of the fuel tank according to a second embodiment of the present invention taken along line 8-8 of FIG. 7;

FIG. 10 is a perspective view of a fuel tank according to a third embodiment of the present invention showing the wall of the fuel tank formed having a central stepped portion, and flat portions formed on each side of the stepped portion;

FIG. 11 is a cross-sectional view of the third embodiment of the present invention taken along line 11-11 of FIG. 10;

DETAILED DESCRIPTION OF THE INVENTION

Figure 1:
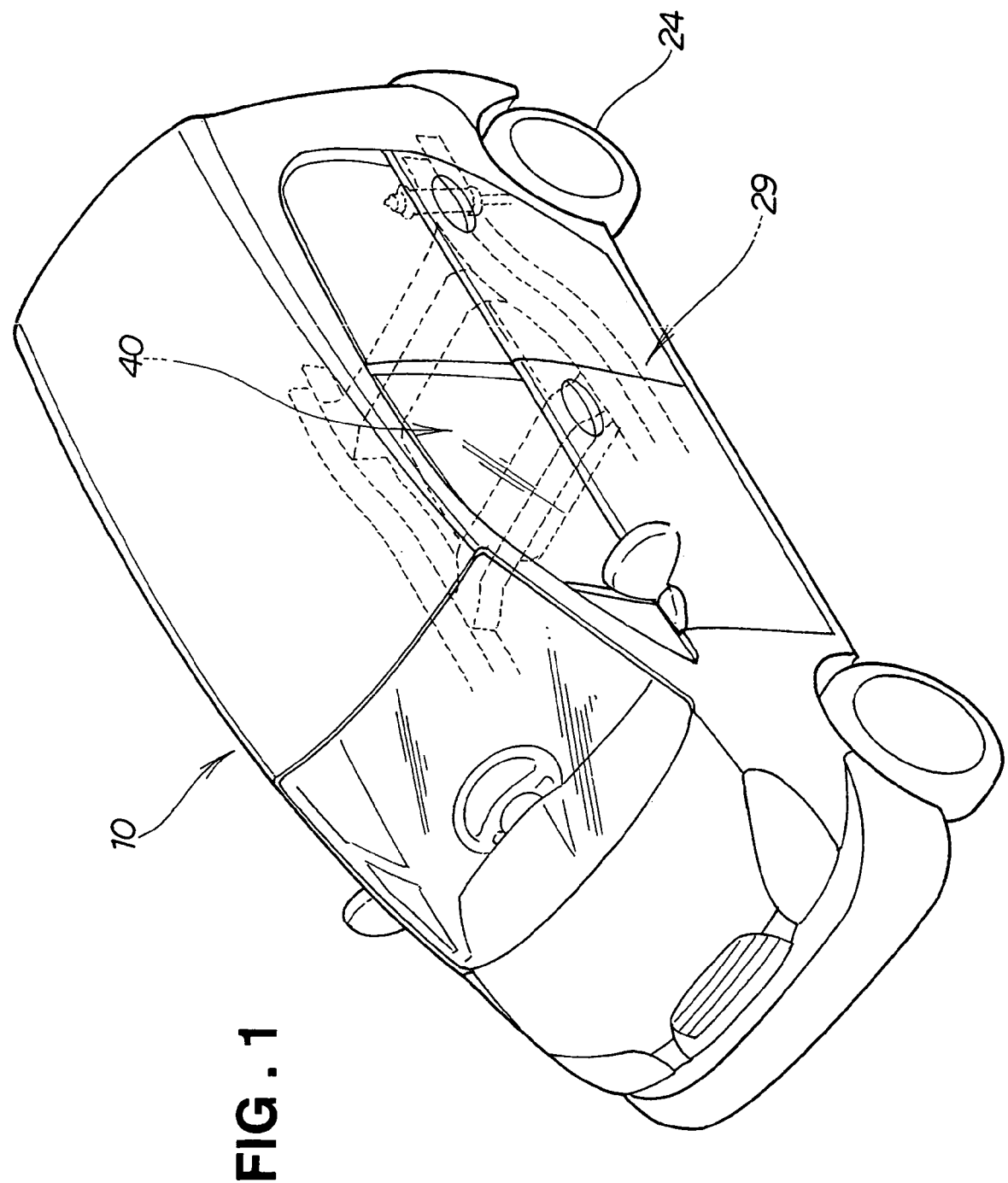
FIG. 1 is a perspective view of a vehicle employing a fuel tank according to the present invention, showing the location of the fuel tank near the rear wheels.

As shown in FIG. 1, a fuel tank 40 is mounted to a vehicle frame 29 of a vehicle 10 near rear wheels 24.

The fuel tank 40 is designed to suppress an abnormal noise (sloshing or liquid moving noise) generated by fuel moving in the tank 40 when the vehicle 10 accelerates or decelerates, as will be described below.

Figure 2:
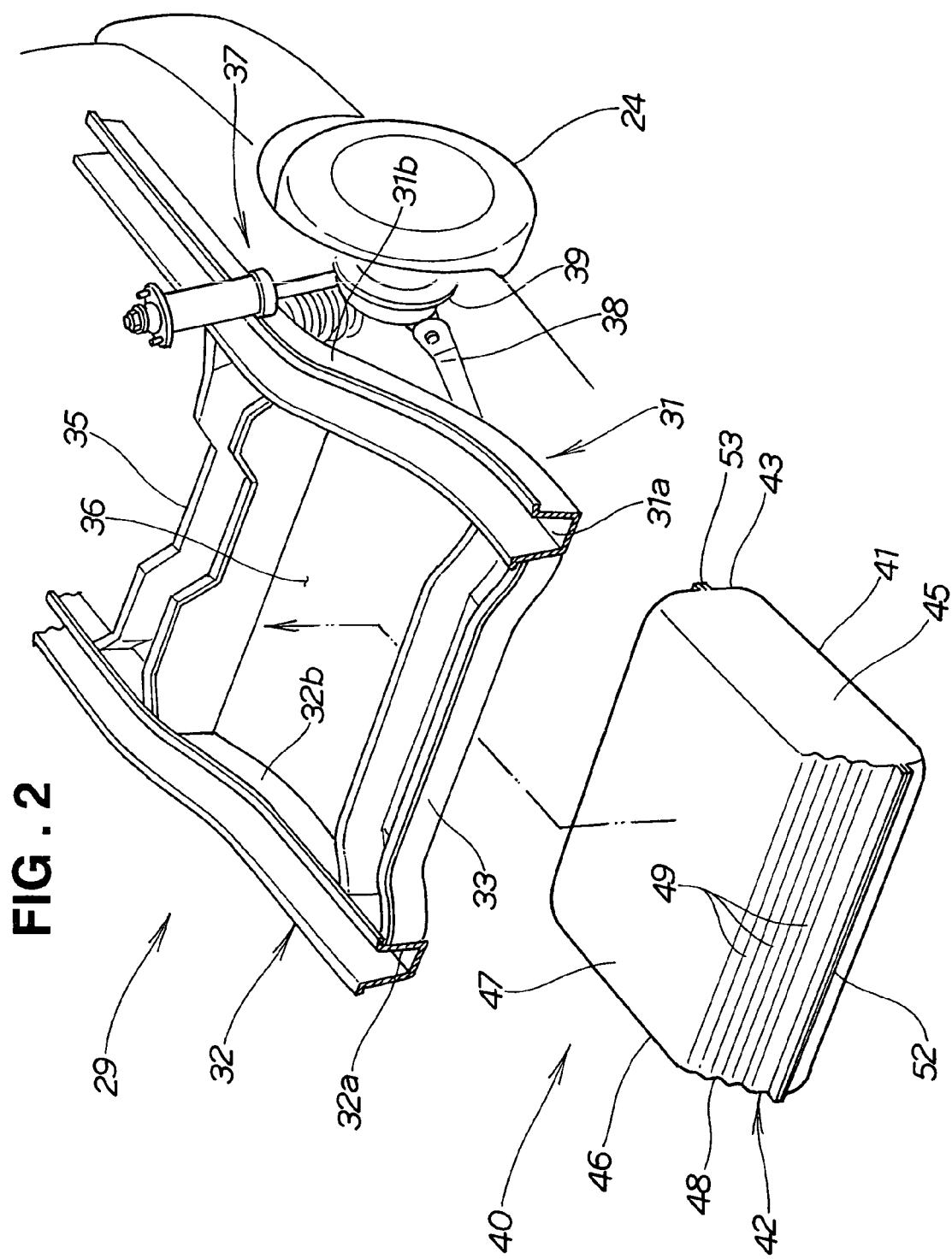
FIG. 2 is an exploded perspective view showing the relationship between the fuel tank of the present invention and a vehicle frame.

FIG. 2 shows the relationship between the fuel tank 40 and the vehicle frame 29.

The vehicle frame 29 includes left and right rear side members 31, 32. A front crossmember 33 extends between front end portions 31a, 32a of the left and right rear side members 31, 32. A rear crossmember 35 extends between substantially middle portions 31b, 32b of the left and right rear side members 31, 32 (specifically, near the rear wheels 24). The left and right rear side members 31, 32, the front crossmember 33 and the rear crossmember 35 form a substantially rectangular space 36. The fuel tank 40 is disposed in the space 36.

The left rear side member 31 has a U-shaped cross section, and extends from the front to the rear of the vehicle body. A left rear axle (not shown) is mounted to the left rear side member 31 via a link unit 38 of a left rear suspension 37. A left brake disc 39 and the left rear wheel 24 are mounted on the axle.

The right rear side member 32 is disposed in parallel with the left rear side member 31 with a given space therebetween, and, like the left rear side member 31, is a member of a substantially U-shaped cross section extending longitudinally. A right rear suspension (not shown) having the same configuration as the left rear suspension 37 is mounted to the right rear side member 32.

Figure 3:
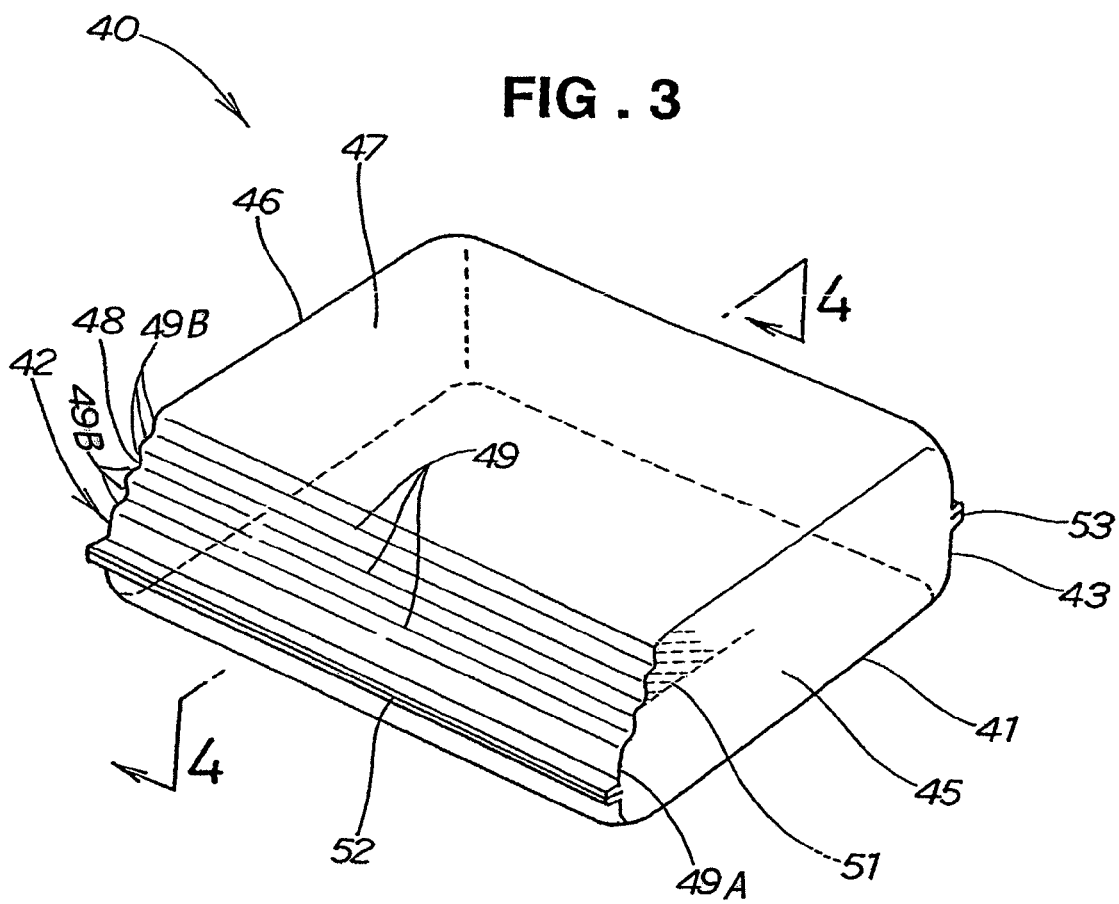
FIG. 3 is a perspective view of the fuel tank in a first embodiment shown in FIG. 2, showing a generally flat, hexahedron shaped body including a rearwardly-inclined front wall.
Figure 4:
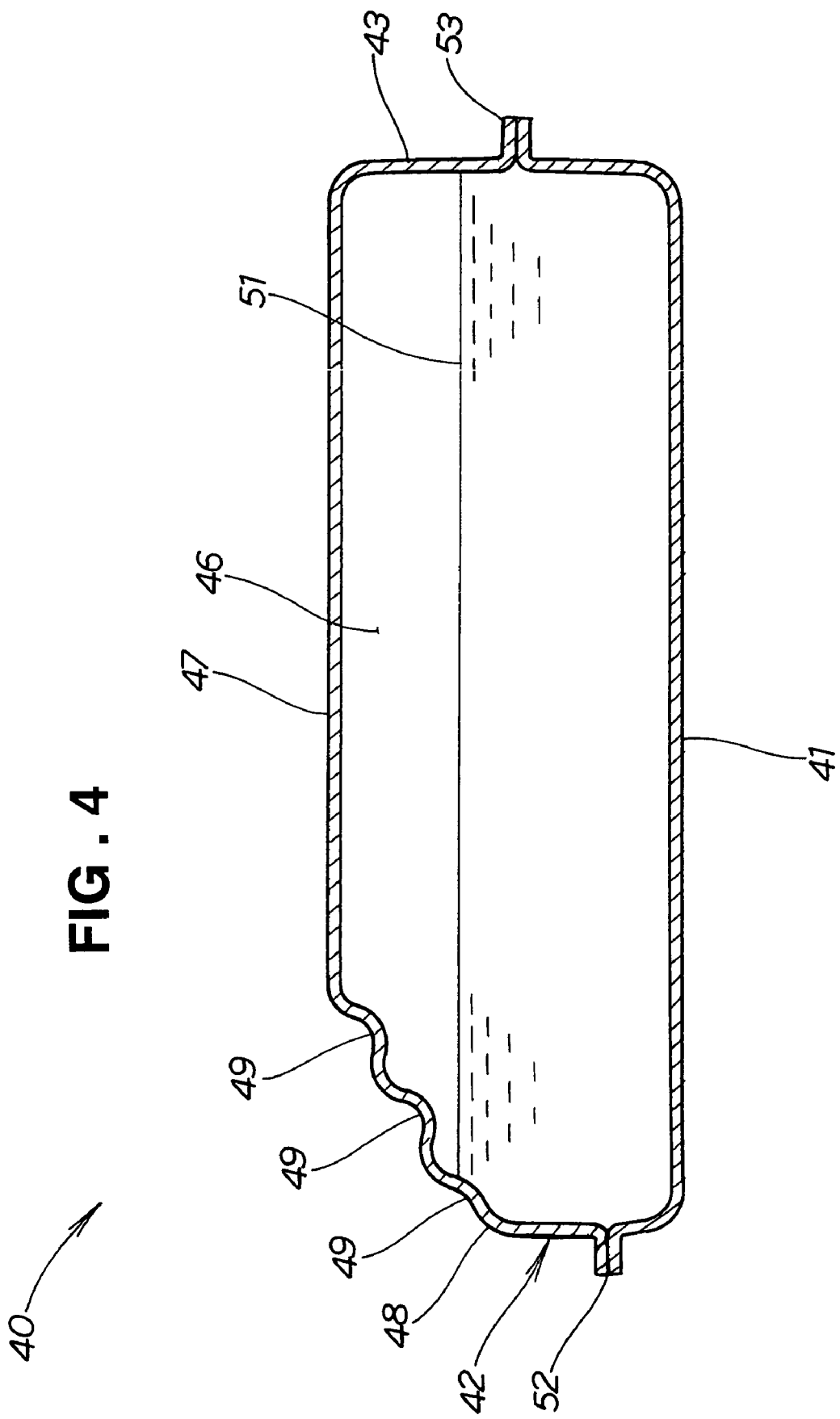
FIG. 4 is a cross-sectional view of the fuel tank taken along line 4-4 of FIG. 3.

As shown in FIGS. 3 and 4, the fuel tank 40 has a substantially hexahedral flat configuration including a substantially rectangular bottom 41 (also referred as a bottom wall 41), front and rear walls 42 and 43 rising from the bottom 41, left and right side walls 45 and 46 rising from the bottom 41, and a substantially rectangular top wall 47 connected to the upper edges of the front wall 42, rear wall 43, left side wall 45 and right side wall 46. An upper portion of the front wall 42 constitutes a rearwardly inclined portion 48 (also referred as a stepped portion 48). The inclined portion 48 is formed with a plurality of steps 49 for suppressing wave motion on the liquid surface of fuel 51 which occurs when the vehicle accelerates or decelerates. It will be understood from FIG. 3 that the plurality of steps 49 in the stepped portion 48 include a first step 49A defining the lowest part of the stepped portion 48 which is inset from one of the front or the rear walls, and the remaining steps 49B rising in sequence such that each succeeding step is higher than a preceding step.

The fuel tank 40 is formed by blow molding, using a resin material. The fuel tank 40 includes front and rear pinched-off portions 52 and 53 at the front and rear walls 42 and 43. The front and rear pinched-off portions 52 and 53 are produced by pinching opposite end portions of a tubular parison (not shown) as an original material by a mold when the fuel tank 40 is blow molded.

The steps 49 are integrally formed in the front wall 42, and suppress wave motion on the liquid surface of the fuel 51 which occurs when the vehicle accelerates or decelerates. This results in a reduced number of components for manufacturing the vehicle fuel tank 40 having a liquid movement suppression effect. Consequently, the number of manufacturing steps is reduced. Also, a reduction in the capacity of the fuel tank 40 can be minimized to ensure the storage capacity of the fuel tank 51.

Next, the function of the fuel tank 40 in the present invention will be described with reference to FIG. 5B in comparison with comparative example fuel tank shown in FIG. 5A.

Figure 5A:
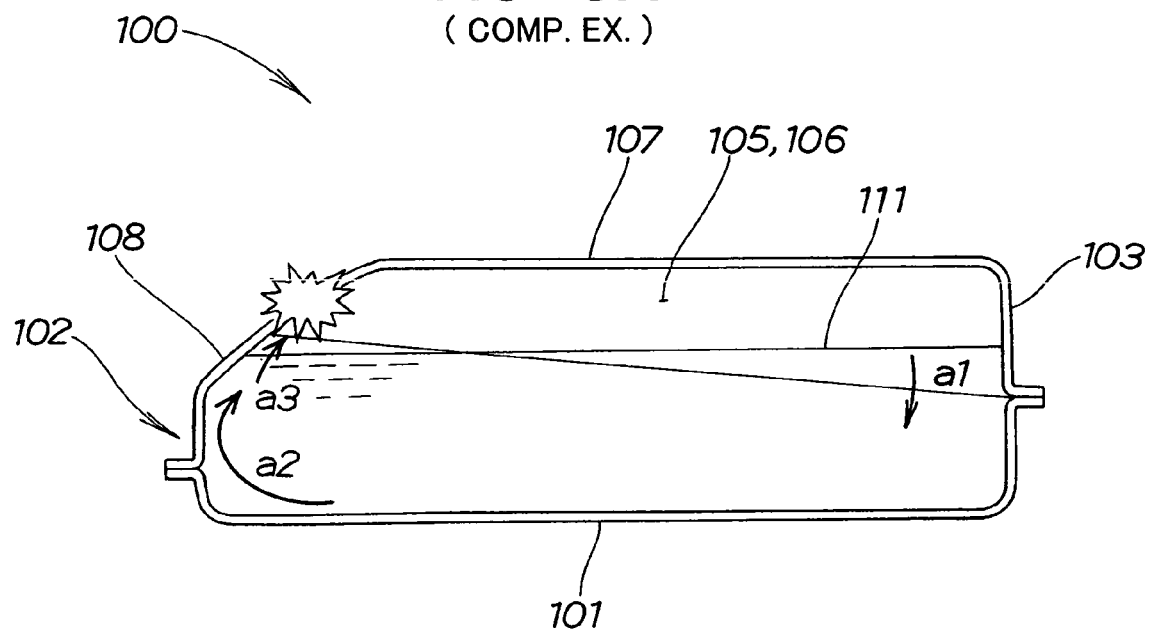
FIG. 5A is a diagram of a prior art fuel tank showing the movement of fuel in a fuel tank according to a comparative example.

A prior art fuel tank 100 in the comparative example shown in FIG. 5A is a plastic tank for storing fuel formed substantially in a hexahedron. The fuel tank 100 includes front and rear walls 102 and 103 and left and right side walls 105 and 106 rising from a bottom 101, and a top wall 107 continuous with the upper edges of the front and rear walls 102 and 103 and the upper edges of the left and right side walls 105 and 106. The front wall 102 constitutes an inclined portion 108.

In the fuel tank 100 of the comparative example, when a vehicle (not shown) stops suddenly, fuel 111 moves forward as shown by arrow a1. A front portion of the fuel 111 strikes the inclined portion 108 of the front wall 102 as shown by arrows a2 and a3, generating an abnormal noise (sloshing or liquid moving noise).

Figure 5B:
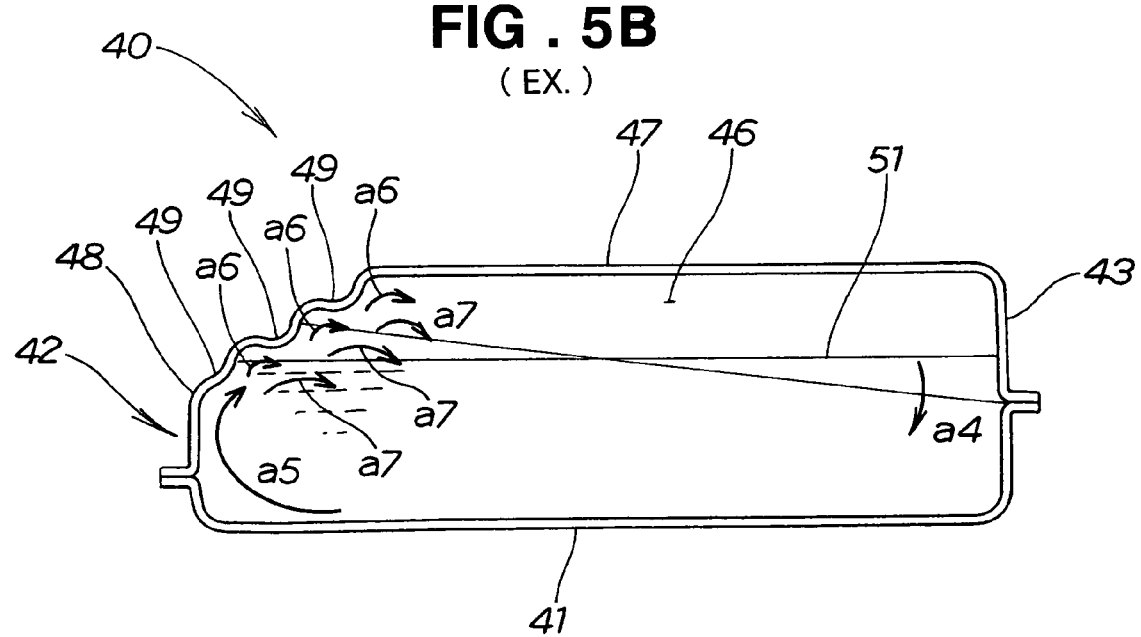
FIG. 5B is a diagram of the fuel tank of the present invention showing the movement of fuel in the fuel tank according to the first embodiment.

In the fuel tank 40 of this embodiment shown in FIG. 5B, when a vehicle suddenly stops, the fuel 51 moves forward as shown by arrow a4, and a front portion of the fuel 51 strikes the inclined portion 48 of the front wall 42 as shown by arrow a5. However, the striking front portion of the fuel 51 is dispersed by the steps 49 as shown by arrows a6 and a7, and the striking energy is lessened. As a result, an abnormal noise (sloshing or liquid moving noise) generated during striking is suppressed.

FIGS. 6A to 6D show front walls according to modifications of the fuel tank 40 in the present invention.

Figure 6A:
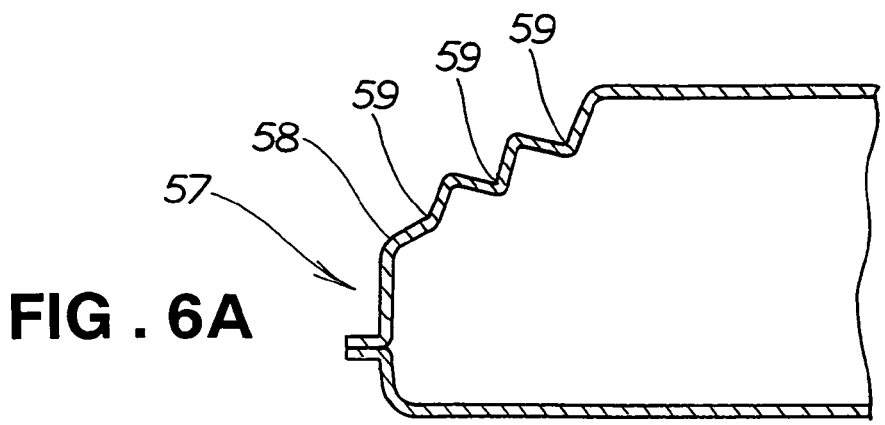
FIG. 6A is a diagram showing a first modification of steps formed in a front wall of the fuel tank shown in FIG. 4 wherein the steps are triangular and are formed on an inclined wall.

A front wall 57 in a first modification shown in FIG. 6A has an inclined portion 58 formed at an upper portion thereof. The inclined portion 58 is formed with a plurality of triangular cross-section steps 59 for suppressing wave motion on the liquid surface of fuel which occurs when a vehicle suddenly stops or decelerates. The steps 59, formed in a triangular shape, can increase moldability in blow molding.

Figure 6B:
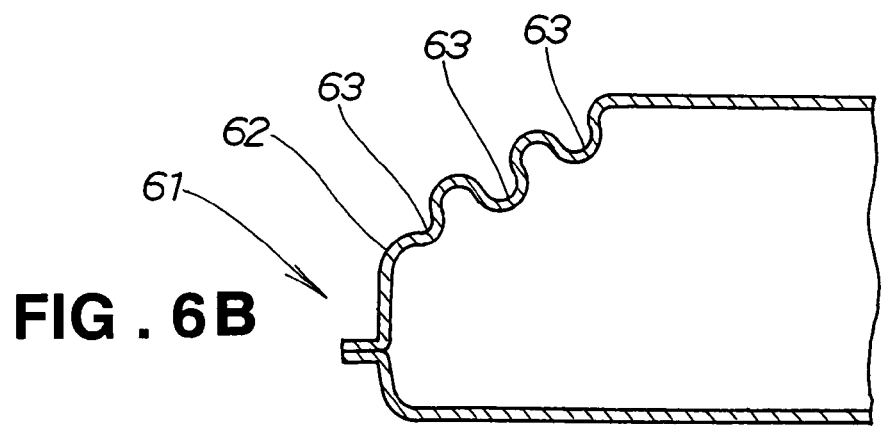
FIG. 6B is a diagram showing a second modification of steps formed in a front wall of the fuel tank shown in FIG. 4 wherein the steps are U-shaped and are formed on an inclined wall.

A front wall 61 in a second modification shown in FIG. 6B has an inclined portion 62 formed at an upper portion thereof. The inclined portion 62 is formed with a plurality of U-shaped cross-section steps 63 for suppressing wave motion on the liquid surface of fuel which occurs when a vehicle suddenly stops or decelerates. The steps 63, formed in a U shape, can increase resistance to the liquid surface and increase the effect of suppressing wave motion on the liquid surface.

Figure 6C:
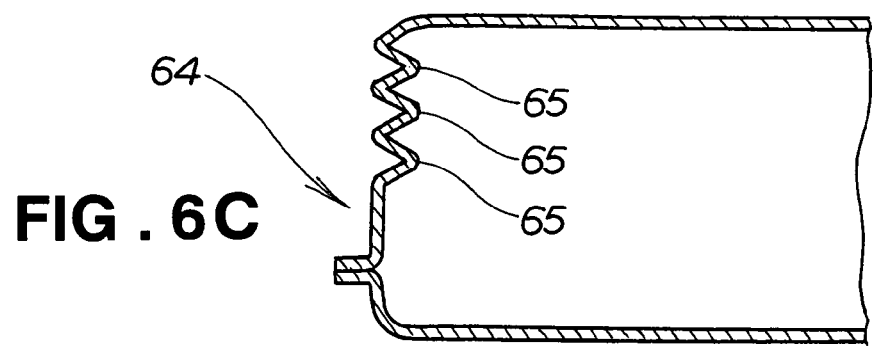
FIG. 6C is a diagram showing a third modification of steps formed in a front wall of the fuel tank shown in FIG. 4 wherein the steps are triangular and are formed on a vertical wall.

A front wall 64 in a third modification shown in FIG. 6C has no inclination, and thus is generally vertical. In at least an upper portion of the vertical surface, a plurality of triangular cross-section steps 65 are formed to suppress wave motion on the liquid surface of fuel which occurs when a vehicle suddenly stops or decelerates. The front wall formed as the vertical surface can increase the volume of the fuel tank.

Figure 6D:
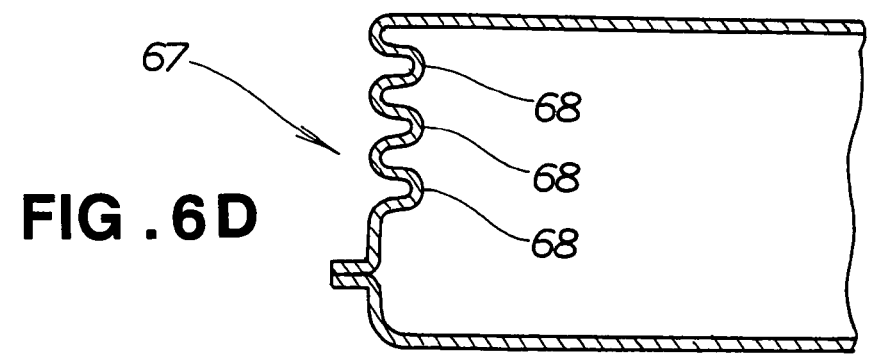
FIG. 6D is a diagram showing a fourth modification of steps formed in a front wall of the fuel tank shown in FIG. 4 wherein the steps are U-shaped and are formed on a vertical wall.

A front wall 67 in a fourth modification shown in FIG. 6D has no inclination, and thus is generally vertical. In at least an upper portion of the vertical surface, a plurality of U-shaped cross-section steps 68 are formed to suppress wave motion on the liquid surface of fuel which occurs when a vehicle suddenly stops or decelerates. As in the above, the front wall 67 formed as the vertical surface can increase the volume of the fuel tank.

Figure 9:
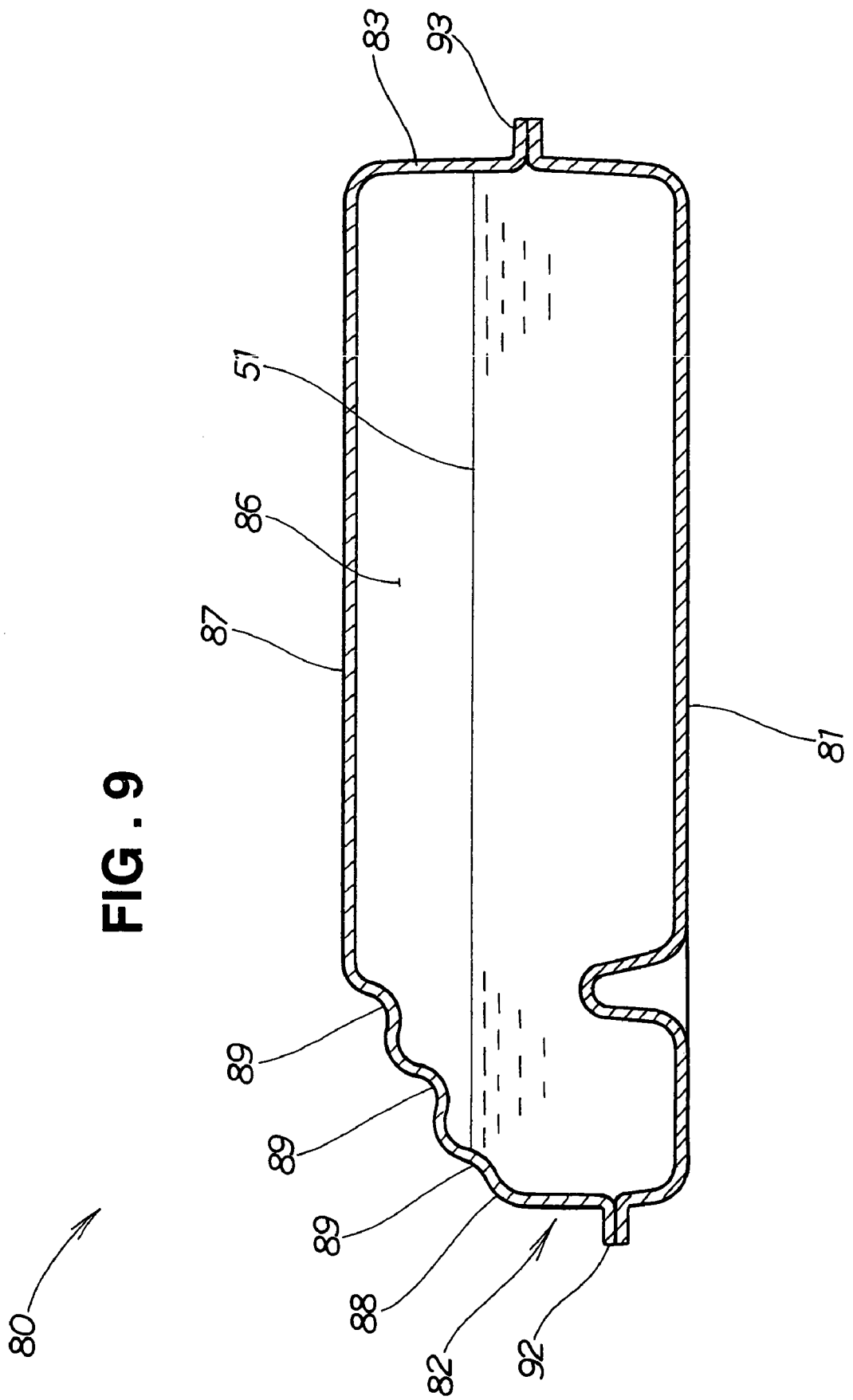
FIG. 9 is a cross-sectional view of the fuel tank according to a second embodiment of the present invention taken along line 9-9 of FIG. 7.

FIGS. 7, 8 and 9 show a fuel tank according to a second embodiment of the present invention.

A fuel tank 80 shown in FIG. 7 has a substantially flat hexahedral configuration including a substantially rectangular bottom 81, front and rear walls 82 and 83 rising from the bottom 81, left and right side walls 85 and 86 rising from the bottom 81, and a substantially rectangular top surface 87 continuous with the upper edges of the front wall 82, rear wall 83, left side wall 85 and right side wall 86. The front wall 82 has an inclined portion 88 at an upper portion thereof. The inclined portion 88 is formed with a plurality of steps 89 for suppressing wave motion on the liquid surface of fuel 51 which occurs when a vehicle suddenly stops or decelerates. In the figure, reference numerals 92 and 93 denote front and rear pinched-off portions formed at the front and rear walls 82 and 83, respectively.

As shown in FIG. 8, the bottom 81 includes a suppression wall 91 for suppressing a longitudinal movement of the fuel 51. The suppression wall 91 is integrally formed with the bottom 81 by being molded at the same time when the fuel tank 80 is blow molded. The suppression wall 91 extends upward from the bottom 81 in parallel with the front and rear walls 82, 83 so as to block the fuel 51 flowing from the rear wall 83 toward the front wall 82, and thereby to suppress a longitudinal movement of the fuel 51.

As shown in FIG. 9, since the fuel tank 80 is provided at the bottom 81 with the suppression wall 91 for suppressing a longitudinal movement of the fuel 51, it further suppresses wave motion on the liquid surface of the fuel 51 which occurs when a vehicle accelerates or decelerates. As a result, an abnormal noise generated by wave motion on the liquid surface of the fuel 51 is further reduced.

FIGS. 10 and 11 show a fuel tank 120 according to a third embodiment of the present invention. In the figures, reference numeral 121 denotes a bottom; 122, a front wall; 123, a rear wall; 125, a left side wall; 126, a right side wall; 127, a top wall; 128, an inclined portion; and 132, 133, pinched-off portions.

The inclined portion 128 includes a stepped portion 128A having a plurality of steps 129 for suppressing wave motion on the liquid surface of fuel 51 which occurs when a vehicle stops or decelerates. In addition, left and right flat portions 134, 135 are formed on the inclined portion 128 on the left and right sides of the steps 129. In this embodiment (FIG. 10), the width of the stepped portion 128A is less than one third of the width of the fuel tank 120 at the inclined portion 128. It will be understood that, the plurality of steps 129 include a first step 129A defining the lowest part of the stepped portion 128A which is inset from one of the front or the rear walls 122, 123, and the remaining steps 129B rising in sequence such that each succeeding step is higher than a preceding step.

As shown in FIG. 11, the front wall 122 has both the steps 129 and the flat portions 134, 135 without steps. When the vehicle stops, a wave is produced on the liquid surface of the fuel 51. When the wave on the liquid surface strikes the front wall 122, the energy of the striking wave is dispersed and made small at the steps 129 as described above. However, at the flat portions 134, 135, the energy of the striking wave is not dispersed and is great. Consequently, wave portions striking the flat portions 134, 135 head toward a wave portion striking the steps 129. These wave portions interfere with each other and reduce the energy of the wave as a whole. As a result, an abnormal noise (sloshing or liquid moving noise) generated when the fuel 51 strikes the front wall 122 can be suppressed.

Figure 12:
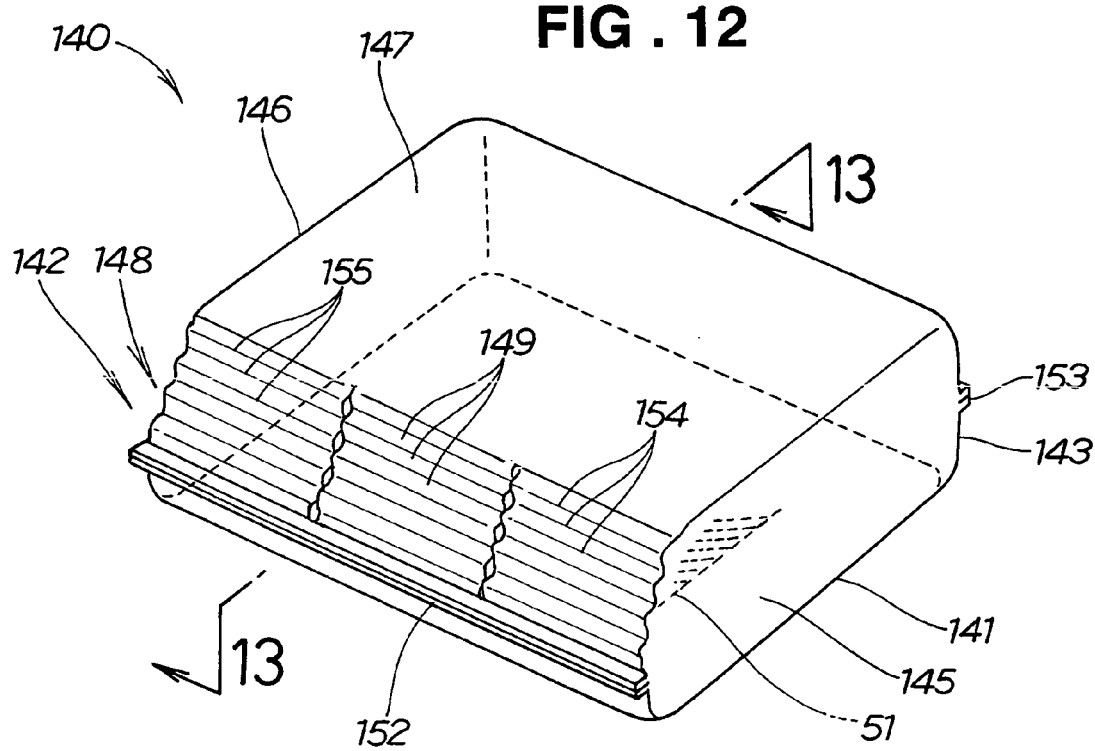
FIG. 12 is a perspective view of a fuel tank according to a fourth embodiment of the present invention showing the wall of the fuel tank formed having a plural stepped portions, including a central stepped portion, and stepped portions of a different phase formed on each side of the central stepped portion.
Figure 13:
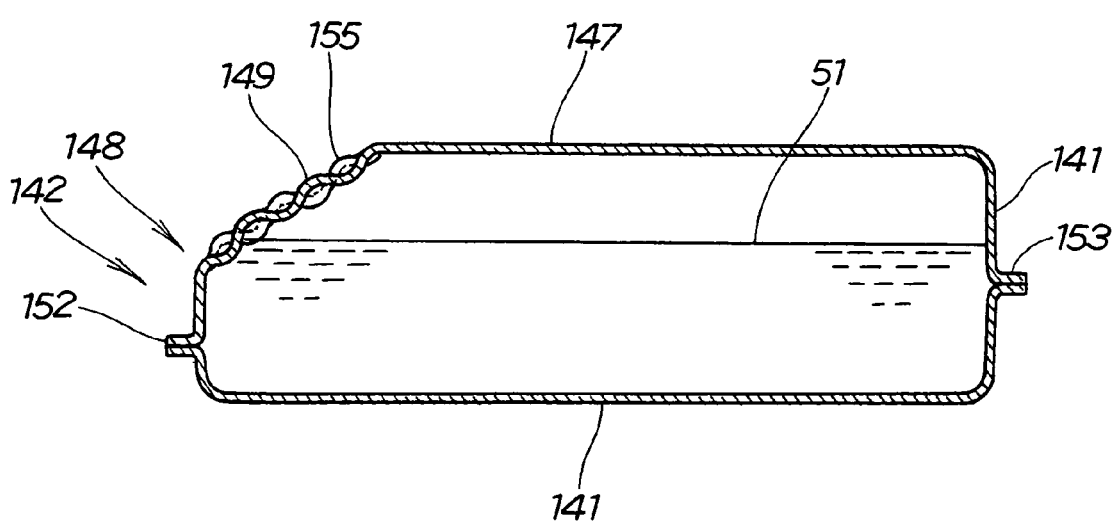
FIG. 13 is a cross-sectional view of the fourth embodiment of the present invention taken along line 13-13 of FIG. 12.
Figure 14:
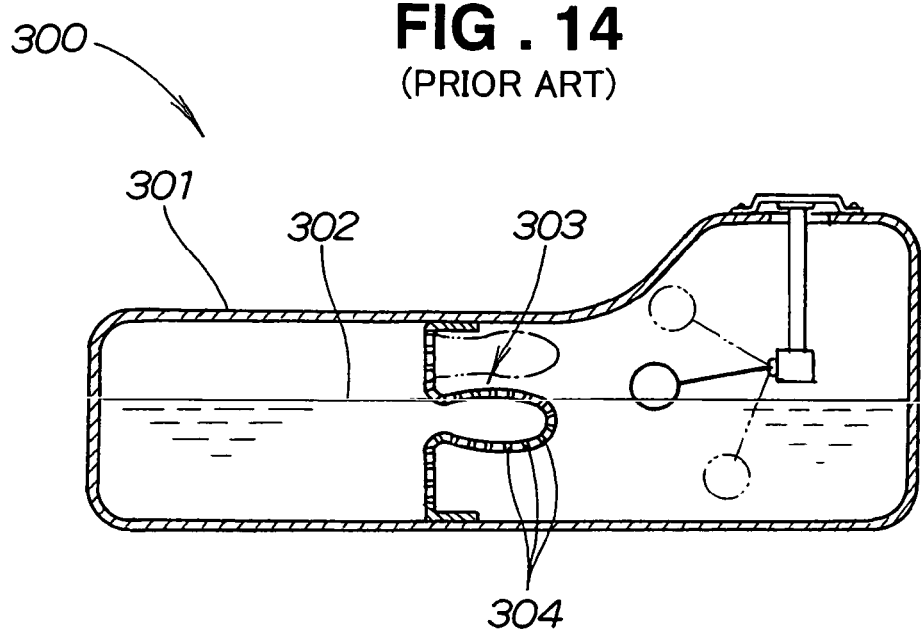
FIG. 14 is a cross-sectional view of a conventional fuel tank with a suppression wall provided separately from a tank body.
Figure 15:
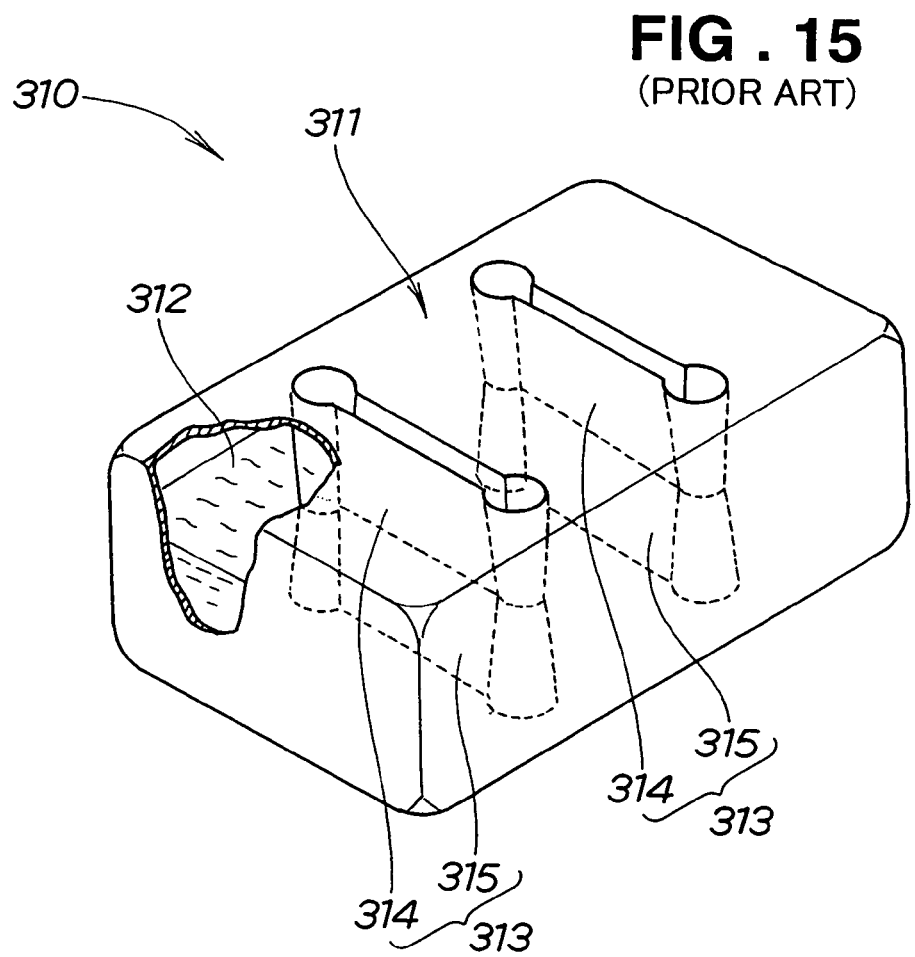
FIG. 15 is a perspective cutaway view of a conventional fuel tank with wave cancellation boards provided in two places within a tank body.

FIGS. 12 and 13 show a fuel tank 140 according to a fourth embodiment of the present invention. In the figures, reference numeral 141 denotes a bottom; 142, a front wall; 143, a rear wall; 145, a left side wall; 146, a right side wall; 147, a top wall; 148, an inclined portion; and 152, 153, pinched-off portions.

The inclined portion 148 includes a plurality of steps 149 for suppressing wave motion on the liquid surface of fuel 51 which occurs when a vehicle stops or decelerates. In addition, left and right steps 154, 155 are formed on the left and right sides of the steps 149. The left and right steps 154, 155 are formed out of phase with the steps 149. This arrangement can stagger the timing of striking of a wave produced by sloshing or flowing of the fuel 51 against the steps 149 and the left and right steps 154, 155. Consequently, the energy of the wave can be dispersed, and an abnormal noise (sloshing or liquid moving noise) can be suppressed.

In the above embodiments, the steps 49 shown in FIG. 4, the steps 129 and the left and right flat portions 134, 135 formed on the left and right of the steps 129 shown in FIG. 10, and the steps 149 and the left and right steps 154, 155 out of phase with the steps 149 shown in FIG. 12 are exemplarily formed in the front walls 42, 122, and 142, respectively, but the present invention is not limited thereto. They may be formed in both front and rear walls, or only in a rear wall.

Also, in the embodiment shown in FIG. 8, the suppression wall 91 is exemplarily formed at the bottom 41, but this is not limiting. It may be formed at the top wall 87.

In the embodiment shown in FIG. 10, the flat portions 134, 135 are formed on the left and right of the steps 129, but this is not limiting. Steps and flat portions may be combined in any desired manner.

In the embodiment shown in FIG. 12, the steps 149 are provided in a middle portion of the front wall 142, and the left and right steps 154, 155 out of phase with the steps 149 are formed on the left and right thereof, but this is not limiting. Steps in different phases may be combined in any desired manner.

Obviously, various minor changes and modifications of the present invention are possible in the light of the above teaching. It is therefore to be understood that within the scope of the appended claims the invention may be practiced otherwise than as specifically described.

What is claimed is:

1. In a vehicle having a frame, a vehicle body which fits over the frame, and a plastic fuel tank for storing fuel, where said fuel tank is supported on the frame so as to be elevated above ground level, the improvement comprising configuring said fuel tank with integral noise-suppressing structure for suppressing noise caused by movement of the fuel during vehicle operation, said fuel tank comprising:
   a substantially flat bottom;
   front and rear walls rising from the bottom;
   left and right side walls rising from the bottom; and
   a substantially flat top wall continuous with upper edges of the front and rear walls and upper edges of the left and right side walls; wherein in a vehicle traveling direction, a length of the substantially flat top wall is more than half of a length of the substantially flat bottom;
   wherein the vehicle body is configured and arranged to substantially cover the fuel tank;
   wherein at least one of the front wall and the rear wall of the fuel tank includes a stepped portion comprising a plurality of steps formed integrally thereon, the stepped portion being integrally formed as part of one of the front wall and the rear wall and extending progressively inwardly in a generally inclined direction as the stepped portion extends upwardly, the stepped portion being operable to suppress wave motion on a liquid surface of the fuel, which occurs when the vehicle accelerates or decelerates; and
   wherein the plurality of steps in the stepped portion includes a first step defining the lowest part of the stepped portion which is inset from one of the front or the rear wall, and the remaining steps rise in sequence such that each respective step is higher than the preceding step.

2. A fuel tank as set forth in claim 1, wherein one of the bottom and the top wall includes a suppression wall for suppressing a longitudinal movement of the fuel.

3. A fuel tank as set forth in claim 1, wherein the at least one of the front wall and the rear wall comprises a combination of the stepped portion and at least one flat portion without steps.

4. A fuel tank as set forth in claim 1, wherein the stepped portion comprises a combination of plural sets of the stepped portions wherein each adjacent set of the stepped portions is out of phase with another set.

5. A fuel tank as set forth in claim 1, wherein the at least one of the front wall and the rear wall comprises the stepped portion disposed centrally thereon, and a pair of flat portions, wherein a flat portion is disposed on each of a right and left side of the stepped portion.

6. A fuel tank as set forth in claim 1, wherein the at least one of the front wall and the rear wall is provided with a portion having a substantially vertical orientation.

7. A fuel tank as set forth in claim 1, wherein the at least one of the front wall and the rear wall is provided with a portion having a substantially inclined orientation.

8. A fuel tank as set forth in claim 1, wherein the at least one of the front wall and the rear wall is provided with a portion having a substantially inwardly inclined orientation.

9. A fuel tank as set forth in claim 1, wherein the stepped portion comprises steps having a generally triangular shape.

10. A fuel tank as set forth in claim 1, wherein the stepped portion comprises steps having a generally U shape.

11. A fuel tank as set forth in claim 1, wherein a width of a stepped top portion is less than one third of a total width of the tank in an area containing the stepped top portion.

12. The fuel tank as set forth in claim 1, wherein each of the front wall and the rear wall includes an integrally pinched-off portion formed by pinching end portions of a parison when said fuel tank is molded.

13. In a vehicle having a frame, a vehicle body which fits over the frame, and a plastic fuel tank for storing fuel, where said fuel tank is supported on the frame so as to be elevated above ground level, the improvement comprising configuring said fuel tank with integral noise-suppressing structure for suppressing noise caused by movement of the fuel during vehicle operation, said fuel tank comprising:
   a substantially flat bottom;
   front and rear walls rising from the bottom;
   left and right side walls rising from the bottom; and
   a substantially flat top wall continuous with upper edges of the front and rear walls and upper edges of the left and right side walls, wherein in a vehicle traveling direction, a length of the substantially flat top wall is more than half of a length of the substantially flat bottom;
   wherein the vehicle body is configured and arranged to substantially cover the fuel tank;
   wherein at least one of the front wall and the rear wall of the fuel tank includes an inclined stepped portion comprising a plurality of steps formed integrally therewith, the stepped portion being integrally formed as part of one of the front wall and the rear wall and extending progressively inwardly in a generally inclined direction as the stepped portion extends upwardly, the stepped portion being operable to suppress wave motion on a liquid surface of the fuel, which occurs when the vehicle accelerates or decelerates; and
   wherein the plurality of steps in the stepped portion include a first step defining the lowest part of the stepped portion which is inset from one of the front or the rear wall, and the remaining steps rise in sequence and move progressively inwardly such that each respective step is higher and further inward than the preceding step.

14. The fuel tank as set forth in claim 13, wherein each of the front wall and the rear wall includes an integrally pinched-off portion formed by pinching end portions of a parison when said fuel tank is molded.

15. In a vehicle having a frame, a vehicle body which fits over the frame, and a plastic fuel tank for storing fuel, where said fuel tank is supported on the frame so as to be elevated above ground level, the improvement comprising configuring said fuel tank with integral noise-suppressing structure for suppressing noise caused by movement of the fuel during vehicle operation, said fuel tank comprising:
　a substantially flat bottom;
　front and rear walls rising from the bottom at opposite ends of the tank;
　left and right side walls rising from the bottom; and
　a substantially flat top wall continuous with upper edges of the front and rear walls and upper edges of the left and right side walls, wherein in a vehicle traveling direction, a length of the substantially flat top wall is more than half of a length of the substantially flat bottom;
　wherein the vehicle body is configured and arranged to substantially cover the fuel tank,
　wherein the front or the rear wall of the fuel tank includes a vertical bottom portion and a stepped top portion, the stepped top portion comprising at least three steps formed integrally thereon, the three steps defining different heights relative to the bottom of the tank,
　wherein the at least three steps in the stepped top portion includes a first step defining the lowest part of the stepped top portion which is inset from one of the front or the rear wall, and the remaining steps rise in sequence and move progressively inwardly such that each respective step is higher and further inward than the preceding step, and wherein the other of the front or rear walls is substantially vertical.

16. A fuel tank as set forth in claim 15, wherein the stepped top portion comprises steps having a triangular cross section, and when viewed in a cross section taken along a vertical plane, the stepped top portion of the wall has a center line which is disposed at an angle relative to the bottom of the tank.

17. A fuel tank as set forth in claim 15, wherein the stepped top portion is comprised of steps having an arcuate cross section, and when viewed in a cross section taken along a vertical plane, the stepped top portion of the wall has a center line which is disposed at an angle relative to the bottom of the tank.

18. A fuel tank as set forth in claim 15, wherein the stepped top portion is comprised of steps having a triangular cross section, and when viewed in a cross section taken along a vertical plane, the stepped top portion of the wall has a center line which is substantially vertical.

19. A fuel tank as set forth in claim 15, wherein the stepped top portion is comprised of steps having an arcuate cross section, and when viewed in a cross section taken along a vertical plane, the stepped top portion of the wall has a center line which is substantially vertical.

20. A fuel tank as set forth in claim 15, wherein a width of the stepped top portion is less than one third of a total width of the tank in an area containing the stepped top portion.

21. The fuel tank as set forth in claim 15, wherein each of the front wall and the rear wall includes an integrally pinched-off portion formed by pinching end portions of a parison when said fuel tank is molded.

22. In a vehicle having a frame, a vehicle body which fits over the frame, and a plastic fuel tank for storing fuel, where said fuel tank is supported on the frame so as to be elevated above ground level, the improvement comprising configuring said fuel tank with integral noise-suppressing structure for suppressing noise caused by movement of the fuel during vehicle operation, said fuel tank comprising:
　a bottom;
　front and rear walls rising from the bottom;
　left and right side walls rising from the bottom; and
　a top wall continuous with upper edges of the front and rear walls and upper edges of the left and right side walls;
　wherein the vehicle body is configured and arranged to substantially cover the fuel tank;
　wherein at least one of the front wall and the rear wall of the fuel tank includes a stepped portion comprising a plurality of steps formed integrally thereon, the stepped portion being integrally formed as part of the tank wall and extending progressively inwardly in a generally inclined direction as it moves upwardly, the stepped portion being operable to suppress wave motion on a liquid surface of the fuel, which occurs when the vehicle accelerates or decelerates;
　wherein the plurality of steps in the stepped portion includes a first step defining the lowest part of the stepped portion which is inset from one of the front or the rear wall, and the remaining steps rise in sequence such that each respective step is higher than the preceding step; and
　wherein a width of a stepped top portion is less than one third of a total width of the tank in an area containing the stepped top portion.

23. In a vehicle having a frame, a vehicle body which fits over the frame, and a plastic fuel tank for storing fuel, where said fuel tank is supported on the frame so as to be elevated above ground level, the improvement comprising configuring said fuel tank with integral noise-suppressing structure for suppressing noise caused by movement of the fuel during vehicle operation, said fuel tank comprising:
　a bottom;
　front and rear walls rising from the bottom;
　left and right side walls rising from the bottom; and
　a top wall continuous with upper edges of the front and rear walls and upper edges of the left and right side walls,
　wherein the vehicle body is configured and arranged to substantially cover the fuel tank;
　wherein at least one of the front wall and the rear wall of the fuel tank includes an inclined stepped portion comprising a plurality of steps formed integrally therewith, the stepped portion being integrally formed as part of the tank wall and extending progressively inwardly in a generally inclined direction as it moves upwardly, the stepped portion being operable to suppress wave motion on a liquid surface of the fuel, which occurs when the vehicle accelerates or decelerates;
　wherein the plurality of steps in the stepped portion include a first step defining the lowest part of the stepped portion which is inset from one of the front or the rear wall, and the remaining steps rise in sequence and move progressively inwardly such that each respective step is higher and further inward than the preceding step; and
　wherein a width of a stepped top portion is less than one third of a total width of the tank in an area containing the stepped top portion.

* * * * *